US011748128B2

(12) United States Patent
Chakraborti et al.

(10) Patent No.: US 11,748,128 B2
(45) Date of Patent: Sep. 5, 2023

(54) FLEXIBLE ARTIFICIAL INTELLIGENCE AGENT INFRASTRUCTURE FOR ADAPTING PROCESSING OF A SHELL

(71) Applicant: International Business Machines Corporation, Armonk, NY (US)

(72) Inventors: Tathagata Chakraborti, Cambridge, MA (US); Mayank Agarwal, Somerville, MA (US); Eli M. Dow, Wappingers Falls, NY (US); Kartik Talamadupula, Port Chester, NY (US); Kshitij Fadnis, Astoria, NY (US); Jorge J. Barroso Carmona, Madrid (ES); Borja Godoy, Badajoz (ES)

(73) Assignee: International Business Machines Corporation, Armonk, NY (US)

( * ) Notice: Subject to any disclaimer, the term of this patent is extended or adjusted under 35 U.S.C. 154(b) by 564 days.

(21) Appl. No.: 16/704,368

(22) Filed: Dec. 5, 2019

(65) Prior Publication Data
US 2021/0173682 A1 Jun. 10, 2021

(51) Int. Cl.
G06F 9/455 (2018.01)
(52) U.S. Cl.
CPC .............. G06F 9/45512 (2013.01)
(58) Field of Classification Search
CPC ..... G06F 9/45512; G06N 20/00; G06N 5/043
See application file for complete search history.

(56) References Cited

U.S. PATENT DOCUMENTS

| 8,056,129 B2 | 11/2011 | Gusler et al. |
| 9,665,831 B2 | 5/2017 | Gaucher et al. |
| 9,942,228 B2 | 4/2018 | Hauser |

(Continued)

FOREIGN PATENT DOCUMENTS

| CN | 108984257 A | 12/2018 |
| CN | 109033277 A | 12/2018 |
| CN | 110447026 A | 11/2019 |

OTHER PUBLICATIONS

A. Fern, et al., "A Decision-Theoretic Model of Assistance", Journal of Artificial Intelligence Research 50 (2014), Submitted Oct. 2013, Published May 2014, 34 pages.

(Continued)

*Primary Examiner* — Jorge A Chu Joy-Davila
(74) *Attorney, Agent, or Firm* — Edell, Shapiro & Finnan, LLC

(57) ABSTRACT

A computer system adapts processing of expressions by a command-line interface. An expression provided to the command-line interface is analyzed, wherein the command line interface includes pre-defined expression processing. One or more artificial intelligence agents are selected from a plurality of artificial intelligence agents based on the analysis of the expression. The expression is evaluated by the selected one or more artificial intelligence agents to determine processing modifications for the pre-defined expression processing. The expression is processed in accordance with the determined processing modifications and results are provided to the command-line interface. Embodiments of the present invention further include a method and program product for adapting processing of expressions by a shell in substantially the same manner described above.

17 Claims, 5 Drawing Sheets

(56) References Cited

U.S. PATENT DOCUMENTS

| | | | |
|---|---|---|---|
| 10,015,178 | B2 | 7/2018 | Schulman et al. |
| 10,366,166 | B2 | 7/2019 | Yu et al. |
| 10,397,262 | B2 | 8/2019 | Karabchevsky et al. |
| 10,419,452 | B2 | 9/2019 | Schulman et al. |
| 10,419,479 | B2 | 9/2019 | Gopalakrishna |
| 10,957,314 | B2 | 3/2021 | Hall et al. |
| 11,501,191 | B2 * | 11/2022 | Shaikh .................. G06F 16/211 |
| 2006/0190579 | A1 | 8/2006 | Rachniowski et al. |
| 2014/0006012 | A1 | 1/2014 | Zhou et al. |
| 2014/0214404 | A1 * | 7/2014 | Kalia ...................... G06F 40/40 704/9 |
| 2014/0280253 | A1 | 9/2014 | Clark et al. |
| 2016/0048514 | A1 | 2/2016 | Allen et al. |
| 2017/0213132 | A1 | 7/2017 | Hammond et al. |
| 2018/0150522 | A1 * | 5/2018 | Moskwinski ..... G06F 16/24575 |
| 2018/0276553 | A1 * | 9/2018 | Redkar .................. G06N 5/022 |
| 2018/0302300 | A1 * | 10/2018 | Moeller-Bertram ... G06N 5/022 |
| 2018/0319014 | A1 * | 11/2018 | Dukatz .................. B25J 9/1697 |
| 2019/0122409 | A1 * | 4/2019 | Meadows ................ G06N 3/08 |
| 2019/0132451 | A1 * | 5/2019 | Kannan ............... H04M 3/5235 |
| 2020/0065697 | A1 * | 2/2020 | Watson ............ G06Q 10/06393 |
| 2020/0106789 | A1 * | 4/2020 | Boros .................. G06N 3/0454 |
| 2020/0143114 | A1 * | 5/2020 | Dua ........................ G06F 3/167 |
| 2021/0117819 | A1 * | 4/2021 | Rao ....................... G06F 16/904 |
| 2021/0174240 | A1 | 6/2021 | Chakraborti et al. |

OTHER PUBLICATIONS

W. Bradley Knox, et al., "Combining Manual Feedback with Subsequent MDP Reward Signals for Reinforcement Learning", Proc. of 9th Int. Conf. on Autonomous Agents and Multiagent Systems (AAMAS 2010), van der Hoek, Kaminka, Lespérance, Luck and Sen (eds ), May 10-14, 2010, Toronto, Canada, 8 pages.

M. Taylor, et al., "Transfer Learning for Reinforcement Learning Domains: A Survey", Journal of Machine Learning Research 10 (2009) 1633-1685, Submitted Jun. 2008, Revised May 2009, Published Jul. 2009, 53 pages.

C, Dann et al., "Policy Certificates: Towards Accountable Reinforcement Learning", arXiv:1811.03056v3 [cs.LG] May 27, 2019, Proceedings of the 36th International Conference on Machine Learning, Long Beach, California, PMLR 97, 2019, 42 pages.

M. Helmert, "The Fast Downward Planning System", Journal of Artificial Intelligence Research 26 (2006) 191-246, Jul. 2006, 56 pages.

O. Etzioni, et al., "A Softbot-Based Interface to the Internet", Communications of the ACM 37, No. 7, Jul. 1994, 6 pages.

O. Etzioni, et al., "OS Agents: Using AI Techniques in the Operating System Environment", Technical Report 93-04-04, Apr. 12, 1993, UW-CSE-93-04-04, University of Washington, 16 pages.

O. Etzioni, et al., "Building Softbots for UNIX", AAAI Technical Report SS-94-03, University of Washington, 1993, 8 pages.

N. Blaylock, "The Linux Plan Corpus: Documentation", Aug. 2010, Institute for Human and Machine Cognition, www.cs.rochester.edu/research/cisd/resources/linux-plan/, 16 pages.

O. Tecuci, et al., "A Generic Memory Module for Events", vol. 68, No. 09, Aug. 2007, 6 pages.

N. Blaylock, "Towards Tractable Agent-based Dialogue", PhD Thesis, University of Rochester, Department of Computer Science, Aug. 2005, 193 pages.

S.R.K. Branavan, et al., "Reinforcement Learning for Mapping Instructions to Actions", ACL '09: Proceedings of the Joint Conference of the 47th Annual Meeting of the ACL and the 4th International Joint Conference on Natural Language Processing of the AFNLP; vol. 1, Aug. 2009, 10 pages.

T.A. Han, et al., "Corpus-Based Incremental Intention Recognition via Bayesian Network Model Construction", ICAPS "Goal, Activity and Plan Recognition" workshop, Freiburg, Germany, Jun. 12, 2011, 23 pages.

R.S. Sutton, et al., "Reinforcement Learnig", An Introduction, a Bradford Book, The MIT Press, Cambridge Massachusetts, London, England, pp. 1-100.

R.S. Sutton, et al., "Reinforcement Learnig", An Introduction, A Bradford Book, The MIT Press, Cambridge Massachusetts, London, England, pp. 101-200.

R.S. Sutton, et al., "Reinforcement Learnig", An Introduction, A Bradford Book, The MIT Press, Cambridge Massachusetts, London, England, pp. 201-331.

T. Chakraborti, et al., "UbuntuWorld 1.0 LTS—A Platform for Automated Problem Solving & Troubleshooting in the Ubuntu OS", arXiv:1609.08524v2 [cs.AI], Aug. 12, 2017, 7 pages.

International Search Report and Written Opinion in corresponding International Application No. PCT/IB2020/061230, dated Mar. 9, 2021, 9 pages.

S. Holland, et al., "Direct Combination", Papers, CHI 99 May 15-20, 1999, 8 pages.

JoséAlberto Rodrigues Pereira Sardinha, et al., "Engineering Machine Learning Techniques into Multi-Agent Systems", PUC-RioInf. MCC12/04, May 2004, 27 pages.

A. Dethise, et al., Conference Paper, "Cracking open the black box: What observations can tell US about reinforcement earning agents", ndl.handle.net/10754/658663, ACM Press, Nov. 26, 2019, 9 pages.

Disclosed Anonymously, "Training Question-Answering System with the User Ratings", ip.com, IPCOM000258153D, Apr. 12, 2019, 3 pages.

Disclosed Anonymously, "Method and System for Providing a Dynamic Sequence of Questions and Actions in Virtual Agents", ip.com, IPCOM000259139D, Jul. 15, 2019, 4 pages.

Disclosed Anonymously, "Method and System for Providing Continuous Learning to Asset Reuse Manager (ARM) to Train Virtual Agent (VA)", ip.com, IPCOM000257613D, Feb. 23, 2019, 3 pages.

List of IBM Patents or Patent Applications Treated as Related, Dec. 5, 2019, 1 page.

Julian V. Serban, et al., "A Deep Reinforcement Learning Chatbot", arXiv preprint arXiv:1709.02349, Sep. 7, 2017, 40 pages.

Vladimir Ilievski, et al., "Goal-Oriented Chatbot Dialog Management Bootstrapping with Transfer Learning", arXiv preprint arXiv:1802.00500, Feb. 1, 2018,7 pages.

Kuznetsov V.A., et al., "Ontological-semantic text analysis and the question answering system using data from ontology". ICACT Transactions on Advanced Communications Technology (TACT), vol. 4, Issue 4. Jul. 2015, 8 pages.

Wikipedia.org page for Sandbox, archive.org capture from Jul. 3, 2018, available at https://web.archive.org/web/20180803222109/https://en.wikipedia.org/wiki/Sandbox_(software_development). PDF, 2 pages, (Year: 2018).

* cited by examiner

FLEXIBLE ARTIFICIAL INTELLIGENCE AGENT INFRASTRUCTURE FOR ADAPTING PROCESSING OF A SHELL

BACKGROUND

1. Technical Field

Present invention embodiments relate to adapting processing of expressions by a shell, and more specifically, to a flexible artificial intelligence agent infrastructure for adapting processing of a shell.

2. Discussion of the Related Art

In computing, a shell refers to a user interface for accessing an operating system's services. A shell may include a command-line interface for receiving user input and presenting to a user the results of processing the user's input. A shell that employs a command-line interface may have limited capabilities, as the shell may only process expressions in a pre-defined manner. For example, if a user desires to execute a complex series of commands, the user must manually input each command, or provide a script that executes the commands. Moreover, inputted expressions must conform to a particular syntax in order to be executed, requiring a user to have a degree of familiarity with the syntax. Thus, conventional shells that employ command-line interfaces are rigid, require expertise to be utilized effectively, and can often require a significant amount of a user's time and attention, even when the user is familiar with the syntax.

SUMMARY

According to one embodiment of the present invention, a computer system adapts processing of expressions by a command-line interface. An expression provided to the command-line interface is analyzed, wherein the command line interface includes pre-defined expression processing. One or more artificial intelligence agents are selected from a plurality of artificial intelligence agents based on the analysis of the expression. The expression is evaluated by the selected one or more artificial intelligence agents to determine processing modifications for the pre-defined expression processing. The expression is processed in accordance with the determined processing modifications and results are provided to the command-line interface.

Various other embodiments of the present invention will now be discussed. In some embodiments, an artificial intelligence agent of the plurality of artificial intelligence agents provides a processing modification comprising a feature that is selected from a group of: an error-correcting feature, a natural language processing feature, an automated troubleshooting feature, an expression sequence automation feature, and a user feedback feature. Thus, each artificial intelligence agents can specialize in its functionality, thereby extending flexibility to the command-line interface. In some embodiments, an artificial intelligence agent of the plurality of artificial intelligence agents provides the expression to the command-line interface, and the artificial intelligence agent is adjusted based on the processing of the expression in accordance with the determined processing modifications. Thus, an artificial intelligence agent can initiate interactions with the command-line interface to evaluate one or more expressions in order to learn their effects. In some embodiments, one or more percepts that are captured from a computing device associated with the command-line interface are analyzed to select the one or more artificial intelligence agents. Thus, a state or context of the computing device can be included as a factor in selecting artificial intelligence agents. In some embodiments, the one or more percepts are analyzed with the selected one or more artificial intelligence agents to determine the processing modifications. By including percepts in the analysis of an expression, the state or context of the computing device can also be included as a factor in determining the processing modifications. In some embodiments, selecting the one or more artificial intelligence agents based on the analysis of the expression includes processing the expression with the plurality of artificial intelligence agents to indicate a confidence score for a decision of one or more artificial intelligence agents of the plurality of artificial intelligence agents, and selecting the one or more artificial intelligence agents based on the indicated confidence scores. Selecting an artificial intelligence agent based on its confidence score ensures that a processing modification determined by the artificial intelligence agent will be relevant or useful. In some embodiments, the one or more artificial intelligence agents are selected by an orchestration layer, and in response to processing the expression and providing the results to the command-line interface, feedback is obtained from a computing device associated with the command-line interface; the feedback is processed to indicate a modification to one or more of: the orchestration layer, and an artificial intelligence agent of the plurality of artificial intelligence agents. Thus, the selection of artificial intelligence agents and the processing modifications determined by the artificial intelligence agents can both be improved over time. In some embodiments, the feedback that may be used to modify the orchestration layer or the artificial intelligence agents is based on one or more from a group of: user-provided feedback, and feedback based on user actions performed subsequent to providing the results to the command-line interface. Thus, both explicit feedback (e.g., user-provided) and implicit feedback (e.g., based on user behavior) can be included as factors in modifying the orchestration layer or artificial intelligence agents. Embodiments of the present invention further include a method and program product for adapting processing of expressions by a shell in substantially the same manner described above.

BRIEF DESCRIPTION OF THE DRAWINGS

Generally, like reference numerals in the various figures are utilized to designate like components.

DETAILED DESCRIPTION

Figure 1A:
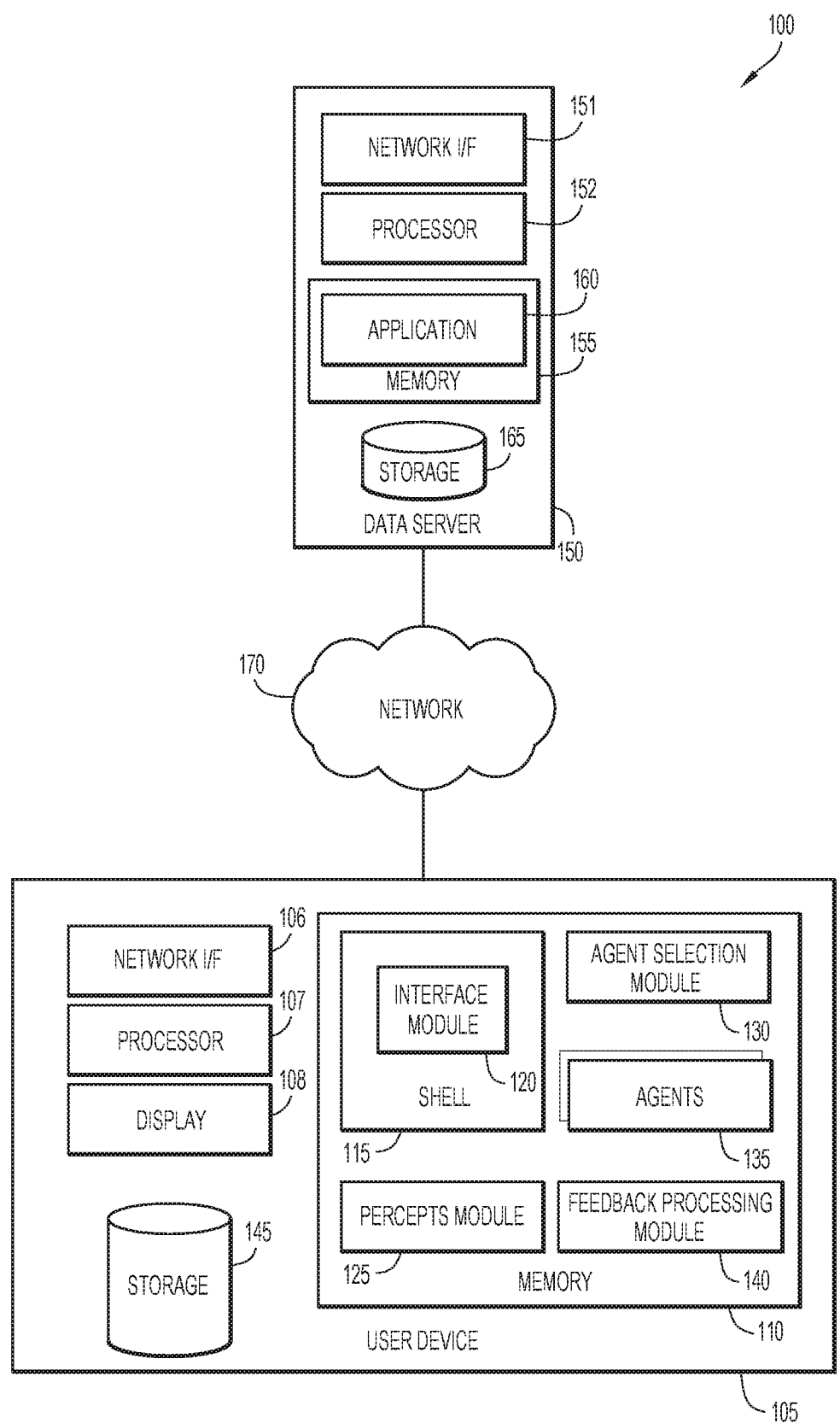
FIG. 1A is a block diagram depicting a computing environment for a flexible artificial intelligence agent infrastructure for adapting processing of a shell in accordance with an embodiment of the present invention.

Present invention embodiments relate to adapting processing of expressions by a shell, and more specifically, to a flexible artificial intelligence agent infrastructure for adapting processing of a shell. A conventional shell, sometimes referred to as a command-line interface or command-line interpreter, presents a text-based user interface through which a user may input expressions for execution by an operating system, which outputs and displays the results to the user. However, conventional shells may be limited in the sense that an inputted expression must comply with a predefined syntax, and even then, a shell may only perform predefined processing of the expression. For example, if user input contains a syntactical error, a shell may only output a generic error message. Moreover, a conventional shell is not flexible: expressions are executed unintelligently, without any consideration for a user's goals and without providing any other assistance to the user, such as automating tasks or providing suggestions to the user.

In contrast, present invention embodiments introduce flexibility to a command-line interface by providing an infrastructure in which artificial intelligence agents can modify aspects of a shell's processing, thereby providing features such as smart automation of processes, enhanced user feedback, automatic syntax correction, and the like. In particular, input provided to a command-line interface of a shell is analyzed to select one or more artificial intelligence agents to modify processing of the input. The input may be provided by a user or by the artificial intelligence agents themselves. Each artificial intelligence agent may include its own set of skills that can be applied to user input to enhance the user's experience. These artificial intelligence agents can be provided as plug-ins to the environment, enabling a user to customize which features the user would like to utilize. Moreover, the selection of artificial intelligence agents can be optimized for a user or set of users by analyzing user feedback and reactions and adjusting the selection process accordingly. Thus, present invention embodiments integrate artificial intelligence agents into a command-line interface to improve the processing of a shell by analyzing input along with the context of the input to, e.g., provide unscripted automation of repetitive tasks, provide sequential decision making, assist in the development of artificial intelligence and machine learning models, assist users without being explicitly tasked, and the like.

Various other embodiments of the present invention will now be discussed. In some embodiments, an artificial intelligence agent of the plurality of artificial intelligence agents provides a processing modification comprising a feature that is selected from a group of: an error-correcting feature, a natural language processing feature, an automated troubleshooting feature, an expression sequence automation feature, and a user feedback feature. Thus, each artificial intelligence agents can specialize in its functionality, thereby extending flexibility to the command-line interface. In some embodiments, an artificial intelligence agent of the plurality of artificial intelligence agents provides the expression to the command-line interface, and the artificial intelligence agent is adjusted based on the processing of the expression in accordance with the determined processing modifications. Thus, an artificial intelligence agent can initiate interactions with the command-line interface to evaluate one or more expressions in order to learn their effects. In some embodiments, one or more percepts that are captured from a computing device associated with the command-line interface are analyzed to select the one or more artificial intelligence agents. Thus, a state or context of the computing device can be included as a factor in selecting artificial intelligence agents. In some embodiments, the one or more percepts are analyzed with the selected one or more artificial intelligence agents to determine the processing modifications. By including percepts in the analysis of an expression, the state or context of the computing device can also be included as a factor in determining the processing modifications. In some embodiments, selecting the one or more artificial intelligence agents based on the analysis of the expression includes processing the expression with the plurality of artificial intelligence agents to indicate a confidence score for a decision of one or more artificial intelligence agents of the plurality of artificial intelligence agents, and selecting the one or more artificial intelligence agents based on the indicated confidence scores. Selecting an artificial intelligence agent based on its confidence score ensures that a processing modification determined by the artificial intelligence agent will be relevant or useful. In some embodiments, the one or more artificial intelligence agents are selected by an orchestration layer, and in response to processing the expression and providing the results to the command-line interface, feedback is obtained from a computing device associated with the command-line interface; the feedback is processed to indicate a modification to one or more of: the orchestration layer, and an artificial intelligence agent of the plurality of artificial intelligence agents. Thus, the selection of artificial intelligence agents and the processing modifications determined by the artificial intelligence agents can both be improved over time. In some embodiments, the feedback that may be used to modify the orchestration layer or the artificial intelligence agents is based on one or more from a group of: user-provided feedback, and feedback based on user actions performed subsequent to providing the results to the command-line interface. Thus, both explicit feedback (e.g., user-provided) and implicit feedback (e.g., based on user behavior) can be included as factors in modifying the orchestration layer or artificial intelligence agents.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Present invention embodiments will now be described in detail with reference to the Figures. FIG. 1A is a block diagram depicting a computing environment 100 for a flexible artificial intelligence agent infrastructure for adapting processing of a shell in accordance with an embodiment of the present invention. As depicted, computing environment 100 includes a user device 105, a data server 150, and a network 170. It is to be understood that the functional division among components of computing environment 100 have been chosen for purposes of explaining present invention embodiments and is not to be construed as a limiting example.

User device 105 includes a network interface (I/F) 106, at least one processor 107, a display 108, and memory 110. Memory 110 may include a shell 115 with an interface module 120, a percepts module 125, an agent selection module 130, one or more agents 135, and a feedback processing module 140. User device 105 may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 106 enables components of user device 105 to send and receive data over a network, such as network 170. In general, a user of user device 105 may provide input to shell 115 via interface module 120, the processing of which may be adapted by one or more artificial intelligence agents. Additionally, a user may be presented with output generated as a result of processing user input in accordance with present invention embodiments. User device 105 may include internal and external hardware components, as depicted and described in further detail with respect to FIG. 4.

Display 108 may include any electronic device capable of presenting information in a visual form. For example, display 108 may be a liquid crystal display (LCD), a cathode ray tube (CRT) display, a light-emitting diode (LED) display, an electronic ink display, and the like. Information relating to a shell having a command-line interface may be displayed to a user of user device 105 via display 108, including expressions input by a user and results of a shell processing those expressions.

Shell 115, interface module 120, percepts module 125, agent selection module 130, agents 135, and/or feedback processing module 140 may include one or more modules or units to perform various functions of present invention embodiments described below. Shell 115, interface module 120, percepts module 125, agent selection module 130, agents 135, and/or feedback processing module 140 may be implemented by any combination of any quantity of software and/or hardware modules or units, and may reside within memory 110 of user device 105 for execution by a processor, such as processor 107.

Shell 115 is an application that enables a user to access functions of an operating system (i.e., the kernel) of user device 105. Shell 115 may also be referred to herein as a command-line interface or command-line interpreter. In particular, shell 115 enables a user to perform file management, process management (including executing and terminating applications), batch processing, and any other processing that is supported by user device 105, its operating system, and any other applications or functions executable by user device 105. Shell 115 may process expressions that conform to the syntax used by shell 115.

Shell 115 may include interface module 120, a text-based command-line interface for the display of input and output of shell 115. In some embodiments, shell 115 provides a computing environment that includes a read-evaluate-print loop: shell 115 employs a read function for reading an input of a user at interface module 120, an evaluate function for evaluating or processing the input, and a print function for printing (i.e., displaying) the results of evaluating the user's input to interface module 120 for review by the user. In contrast to shells that employ conventional read-evaluate-print loops to perform pre-defined expression processing, one or more of the read, evaluate, and/or print functions of shell 115 may be accessible by other modules of user device 105 in order to adapt the expression processing of shell 115.

Percepts module 125 collects percepts from user device 105 and its modules, which include any information relating to the functioning and context of user device 105 during a user session of shell 115. In particular, percepts can include any measureable information that relates to the functioning of user device 105 and its modules, including any deltas resulting from a user's input to user device 105, information relating to the state of user device 105 (such as information relating the state of processor 107, memory 110, and storage 145), computing resource utilization of user device 105 (including processor utilization, memory utilization, storage utilization, network utilization, etc.), and/or any other information. Thus, percepts captured by percepts module 125 describe the context in which a user provides an expression for processing.

Agent selection module 130 may analyze an expression input by a user or agent 135 to shell 115 in order to select one or more agents 135 for further evaluation of the expression. In some embodiments, the expression may be the output of execution (e.g., the output of processing a user-provided expression or agent-provided expression). In some embodiments, agent selection module 130 includes an orchestration layer that enables agents 135 to access shell 115 in order to determine processing modifications for shell 115. Agent selection module 130 may consider user input, percepts, a user's identity, and/or confidence scores of agent 135 in order to make a selection of agents 135 for analyzing a particular expression.

In some embodiments, agent selection module 130 selects agents 135 based on analysis of input, percepts, and/or the identity of a user. Agent selection module 130 may include a mapping of particular user inputs or percepts to artificial intelligence agents; in some embodiments, the mapping may be user-specific and can be provided and/or modified by a user. For example, if a user provides an expression that would result in a syntactical error, agent selection module 130 may select an agent that specializes in the automatic correction of syntax. As another example, if percepts indicate that a user session of shell 115 is causing excessive utilization of processor 107, agent selection module 130 may select an agent that analyzes expressions to determine whether the similar or other expressions can be provided that would accomplish a same or similar goal while utilizing fewer processing resources.

In some embodiments, agent selection module 130 may pass an expression to one or more agents 135, and each agent 135 may evaluate the expression to determine an action that the agent would perform, if selected by agent selection module 130, and a confidence score for that action. Each confidence score of an agent 135 may represent an estimated likelihood that the selected action would be received favorably by a user, and can be based on actual historical user reactions or other factors. Agent selection module 130 may then select one or more agents 135 based on their self-reported confidence scores. In some embodiments, agent selection module 130 may select any one or more agents whose scores exceed a predetermined threshold. In other embodiments, agent selection module 130 selects the one or more agents having the highest confidence score(s).

Additionally, agent selection module 130 may apply a weighted value to the self-reported confidence score of each agent 135 in order to increase or decrease confidence scores independently and in an agent-specific manner. For example, a first agent may have a weighted value of 0.5 applied to its confidence score, and a second agent may have a weighted value of 1.75 applied to its confidence score; thus, if both agents report a confidence of 0.8 prior to applying the weighted values, agent selection module 130 will select the second agent over the first agent due to its higher confidence score after weighting.

Agent selection module 130 may consider previous user feedback when selecting agents 135. In some embodiments, a user may provide explicit feedback by evaluating a particular intervention of an agent. For example, if a user approves of an action performed by an agent, the user may indicate thusly, and agent selection module 130 may be more likely to select that agent in the future (e.g., by increasing the weight value of that agent). In some embodiments, agent selection module 130 may analyze subsequent shell input of a user and/or percepts to assign a positive or negative value to an agent of the one or more agents 135. For example, if a user reverses an action performed by an agent, that agent might receive a negative value to cause agent selection module 130 to be less likely to select that agent in the future. Similarly, if a user does not provide explicit feedback approving of an agent's interaction, but the user continues to allow the agent to intervene in a similar manner, agent selection module 130 may be more likely to select that agent when a same or similar expression is inputted by the user in the future. In some embodiments, the weighted values for agents may be automatically learned according to the explicit or implicit feedback of the user.

In some embodiments, agent selection module 130 may employ a conventional or other vector space model to select agents based on analysis of feature vectors. In particular, an inputted expression and/or percepts may be encoded in a feature vector, and processed with a model trained using conventional or other machine learning techniques to select one or more agents 135. The vector space model may be modified based on user feedback and subsequent interactions in order to improve the accuracy of the model over time.

Agents 135 include one or more artificial intelligence agents that can evaluate an expression input by a user to determine processing modifications for shell 115. Agents 135 may be provided as plug-ins that can be installed into the environment of shell 115, and each agent 135 may include a particular set of skills or actions that can be performed to modify the expression processing of shell 115. Agents 135 may modify one or more functions of the read function, the evaluate function, and the print function of a read-evaluate-print loop of shell 115. For example, an agent may modify how user input is read, how an expression is evaluated, and/or how output is printed for a user to review. A user may specify his or her preferences relating to agents 135, such as which agents in particular are permitted to access shell 115, which actions the agents may or may not perform, and the like. Thus, agents 135 can transform a conventional command-line interpreter into a generic application programming interface (API)-based environment in a manner that abstracts unimportant details away from a user and provides integration of various artificial intelligence or machine learning skills.

In some embodiments, an artificial intelligence agent of agents 135 provides unscripted automation of repetitive tasks. An artificial intelligence agent may automate repetitive tasks by utilizing a high-level automated planning model to create sequences of actions automatically. For example, if a user typically enters a series of expressions in a particular sequence, the artificial intelligence agent may automatically generate a script including the series of expressions. The user may be informed of the name of the script or an expression or command to activate the script, or the user may provide their own name or title for the script. In the future, when a user modifies certain expressions, the artificial intelligence agent may automatically replace the content of the script. For example, if one or more expressions previously contained a particular Internet Protocol (IP) address that has changed, the artificial intelligence agent may update a script accordingly. In some embodiments, an artificial intelligence agent of agents 135 simplifies complex orchestrations by employing conventional or other sequential decision making techniques to determine which expressions to execute and when the expressions should be executed. For example, execution of some expressions may be time-consuming yet less important than other expression, and should be performed toward the end of a script's sequence.

In some embodiments, an artificial intelligence agent of agents 135 provides support, recommendations, and/or proactive troubleshooting to a user. If a user enters an expression that results in an error, such as because the expression contains a syntactical error or requires a prerequisite command to be executed first, an artificial intelligence agent may diagnose and correct the error for the user. To correct an error, an artificial intelligence agent may identify a correction to the syntax of an expression, may identify a prerequisite command or commands that must be executed prior to execution of the desired expression, may identify an additional program, library, etc., that must be installed on user device 105 to execute the expression, and the like. In some embodiments, the artificial intelligence agent provides feedback to a user to describe which action(s) were taken to remedy the user's error, thereby enabling the user to learn from his or her mistake to avoid making similar errors in the future.

An artificial intelligence agent of agents 135 can access other data sources, such as data on data server 150, in order to determine how to address a particular error. For example, an artificial intelligence agent may access a support section of a software developer's website to obtain documentation that includes a solution to a particular error, to look up an error code, and the like. Additionally or alternatively, an artificial intelligence agent may access a web forum or other platform to find discussions related to the error and its solutions.

In some embodiments, an artificial intelligence agent of agents 135 implements natural language processing skills in shell 115. An artificial intelligence agent may interpret input of a user that includes natural language to identify and execute corresponding commands. For example, instead of learning how to manually renew a Dynamic Host Configuration Protocol (DHCP) lease, a user may input "renew DHCP lease," a natural language phrase that does not conform to the syntax of shell 115. In response, an artificial intelligence agent may employ conventional or other natural language processing to parse the input in order to identify which expressions should instead be executed by shell 115 (e.g., "sudo dhclient -r eth0; sudo dhclient eth0," which may release and renew the lease on interface eth0).

An artificial intelligence agent of agents 135 may, in response to an error code at the evaluation step of a read-evaluate-print loop, intervene in the processing of an expression to perform natural language processing in order to look up the error and possible solutions, perform remedial actions, and the like. In some embodiments, an artificial intelligence agent may provide automation by modifying processing of a command-line interface such that when a user provides a single expression, (e.g., "do task XYZ"), the agent will execute a series of commands (e.g., "command p; command q; command r"). In some embodiments, an artificial intelligence agent modifies processing of a command-line interface by processing a user's input using natural language processing so that a user may provide input (e.g., "do XYZ"), and the agent intervenes in the processing of the expression (e.g., so that an error code is not returned) to determine which expressions should be executed to accomplish the user's task (e.g., "XYZ"), and then execute those expressions. In some embodiments, an artificial intelligence agent modifies processing of a command-line interface by evaluating a user's expression according to a modified or unmodified manner, and then providing additional output, such as pedagogical feedback (e.g., "command q is a better way to do this").

Feedback processing module 140 analyzes user feedback to modify agent selection module 130 and/or agents 135. Feedback processing module 140 may prompt a user to provide feedback after one or more agents 135 intervene in the processing of an expression. For example, feedback processing module 140 may prompt a user to provide a score, based on a rubric, to indicate whether the user deems an intervention as positive or negative. Alternatively, a user may simply make a binary selection of whether or not the user liked the intervention. Additionally or alternatively, feedback processing module 140 may analyze subsequent user activity, including expressions that a user subsequently provides to shell 115 as well as percepts of user device 105 collected by percepts module 125, to determine whether an intervention should be scored as positive or negative. For example, if a user performs remedial actions to reverse or counteract actions taken by an agent 135, then feedback processing module 140 may adjust agent selection module 130 so that the agent 135 is less likely to be selected in a same or similar context in the future. In contrast, if a user continues to allow the same or similar intervention of an agent 135 to occur, then feedback processing module 140 may adjust agent selection module 130 so that the agent 135 is more likely to be selected in a same or similar context in the future. To modify agent selection module 130, feedback processing module 140 may modify weights associated with agents 135, may modify vectors in a vector space model, or may perform other adjustments according to the specific selection criteria that are employed, in order to increase or decrease the likelihood that an agent will be selected in the future based on corresponding positive or negative user feedback.

Storage 145 may include any non-volatile storage media known in the art. For example, storage 145 can be implemented with a tape library, optical library, one or more independent hard disk drives, or multiple hard disk drives in a redundant array of independent disks (RAID). Similarly, data in storage 145 may conform to any suitable storage architecture known in the art, such as a file, a relational database, an object-oriented database, and/or one or more tables. Storage 145 may store data relating to adapting the processing of expressions in a shell, including current or previous percepts, user feedback, user preferences associated with agents, and the like.

Data server 150 may include a network interface 151, at least one processor 152, memory 155, and storage 165. Memory 155 may include an application 160. In various embodiments of the present invention, data server 150 may include a laptop computer, a tablet computer, a netbook computer, a personal computer (PC), a desktop computer, a personal digital assistant (PDA), a smart phone, or any programmable electronic device capable of executing computer readable program instructions. Network interface 151 enables components of data server 150 to send and receive data over a network, such as network 170. In general, data server 150 stores information that may be accessed by one or more agents 135 of user device 105 in the performance of tasks.

Application 160 may include one or more modules or units to perform various functions of present invention embodiments in support of agents 135 of user device 105. Application 160 may be implemented by any combination of any quantity of software and/or hardware modules or units, and may reside within memory 155 of data server 150 for execution by a processor, such as processor 152. One or more agents 135 may implement APIs to access application 160 and information in its memory in order to carry out tasks. As an example, data server 150 may be a content management system and application 160 may represent a search service; in this example embodiment, an agent 135 may access application 160 to execute a query in order to retrieve information required in providing a particular skill to shell 115.

Storage 165 may include any non-volatile storage media known in the art. For example, storage 165 can be implemented with a tape library, optical library, one or more independent hard disk drives, or multiple hard disk drives in a redundant array of independent disks (RAID). Similarly, data in storage 165 may conform to any suitable storage architecture known in the art, such as a file, a relational database, an object-oriented database, and/or one or more tables. In some embodiments, storage 165 may store data that can support the functions of one or more agents 135. For example, an agent 135 may be required to execute a database query in order to provide a particular skill to shell 115. In some embodiments, storage 165 may comprise a repository of applications that is accessible by an agent 135 in order to install a particular application on user device 105.

Network 170 may include a local area network (LAN), a wide area network (WAN) such as the Internet, or a combination of the two, and includes wired, wireless, or fiber optic connections. In general, network 170 can be any combination of connections and protocols known in the art that will support communications between user device 105 and data server 150 via their respective network interfaces in accordance with embodiments of the present invention.

Figure 1B:
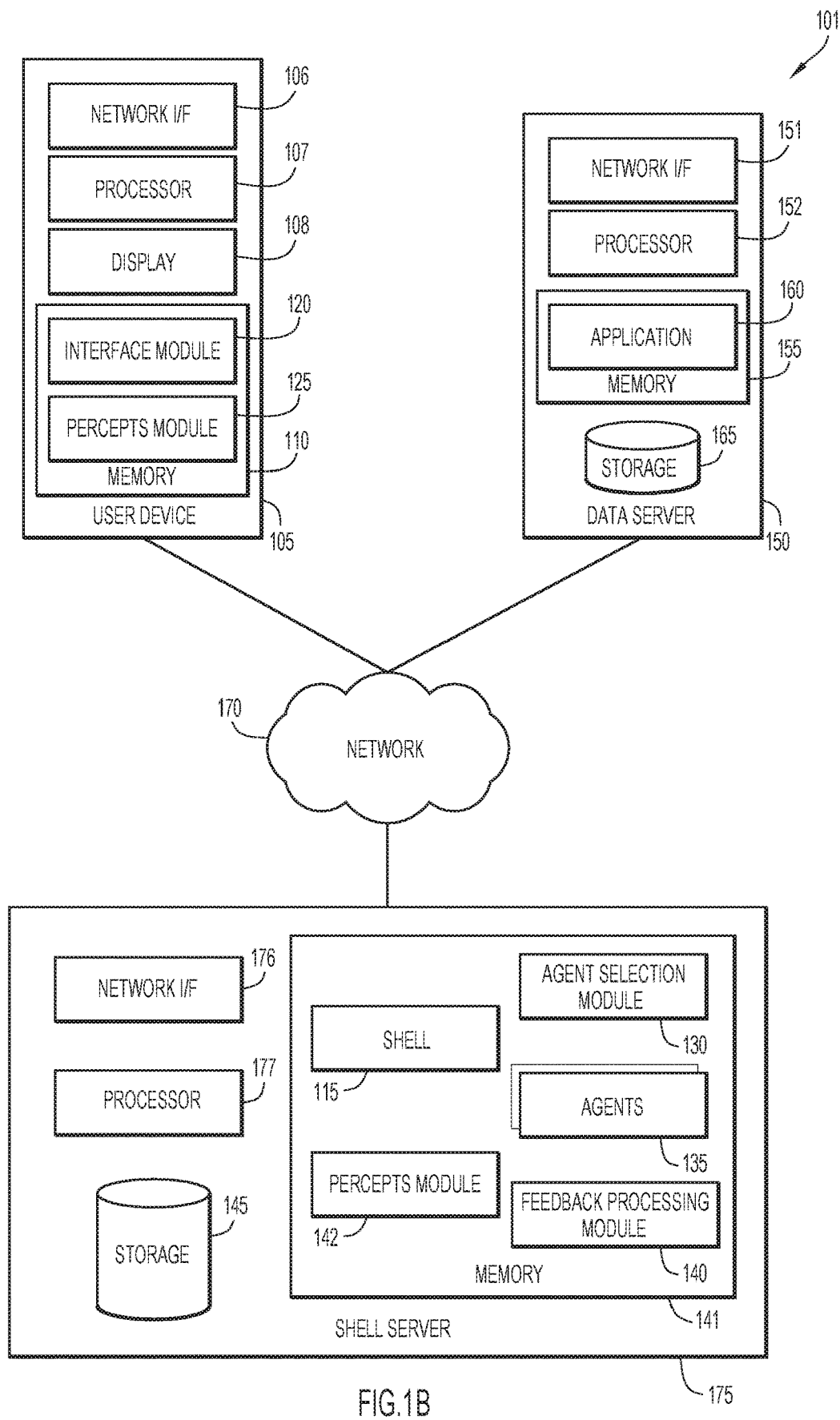
FIG. 1B is a block diagram depicting a computing environment for a flexible artificial intelligence agent infrastructure for adapting processing of a shell in accordance with another embodiment of the present invention.

FIG. 1B is a block diagram depicting a computing environment 101 for a flexible artificial intelligence agent infrastructure for adapting processing of a shell in accordance with another embodiment of the present invention. Computing environment 101 includes a user device 105, a data server 150, a shell server 175, and network 170. In contrast to computing environment 100, user device 105 of computing environment 101 is a client of shell server 175, which provides artificial intelligence agents to provide modifications to the pre-defined expression processing of a shell in accordance with presented embodiments.

User device 105 of computing environment 101 includes interface module 120 and percepts module 125 in memory 110 of user device 105. Interface module 120 may access shell server 175 and its modules to execute, via processor 177 of shell server 175, expressions provided by a user of user device 105. Percepts module 125 may capture percepts local to user device 105, whereas percepts module 142 captures percepts local to shell server 175. Network 170 supports communications between user device 105, data server 150, and shell server 175 via network interfaces 106, 151, and 176, respectively.

Figure 2:
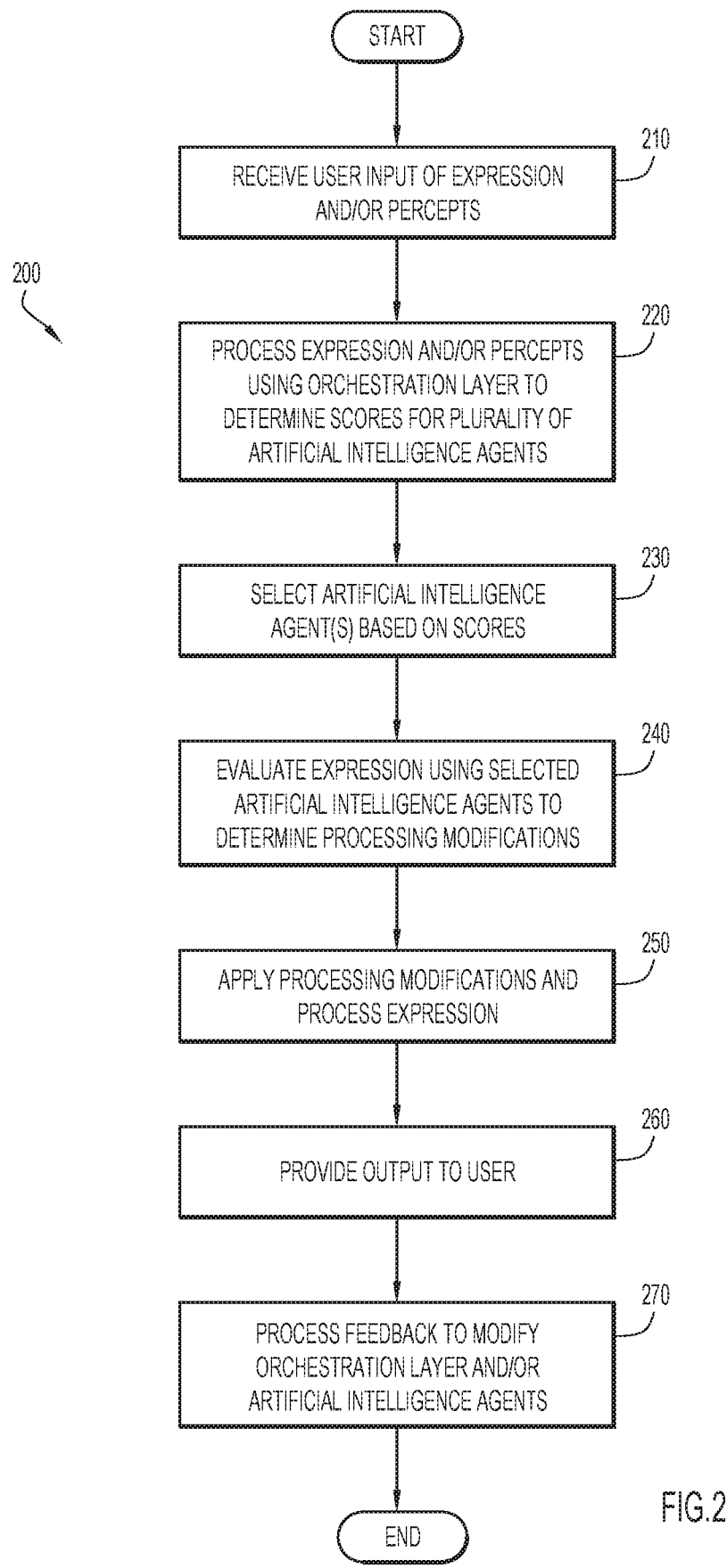
FIG. 2 is a flow chart depicting a method of adapting processing of a shell in accordance with an embodiment of the present invention.

FIG. 2 is a flow chart depicting a method 200 of adapting processing of a shell in accordance with an embodiment of the present invention.

User input of an expression and percepts are received at operation 210. A user of user device 105 may input an expression to interface module 120 for processing by shell 115. The expression may not necessarily be syntactically-correct, as present embodiments can correct syntax errors. Percepts corresponding to the context in which the user input is provided may also be received. Percepts are initially collected by percepts module 125, and may include any measureable information that relates to the functioning of user device 105 and its modules, including information relating to the state of user device 105 (such as information relating the state of processor 107, memory 110, and storage 145).

The expression and/or percepts are processed using an orchestration layer to determine scores for the plurality of artificial intelligence agents at operation 220. An orchestration layer of agent selection module 130 analyzes one or more of the received expression and the percepts to calculate scores or values for selecting the plurality of artificial intelligence agents. Conventional or other approaches may be used for scoring each artificial intelligence agent. In some embodiments, an a priori approach is used in which artificial intelligence agents are selected based on the expression and/or percepts. For example, the expression and/or percepts may contain keywords or other features that are associated with positive or negative values for particular artificial intelligence agents. In some embodiments, the orchestration layer provides agents 135 with the expression and/or the percepts, and each artificial intelligence agent calculates a confidence score representing the likelihood that an action of the artificial intelligence agent would be useful to a user's goal or current task. In some embodiments, the orchestration layer utilizes a vector space model, and encodes the expression and/or percepts as a feature vector.

One or more artificial intelligence agents are selected based on their scores at operation 230. In some embodiments, an artificial intelligence agent is selected when it has a highest score or when its score surpasses a particular threshold value. In some embodiments, weights are applied to one or more scores of artificial intelligence agents prior to selection. In some embodiments in which a vector space model is utilized, an artificial intelligence agent whose vector representation is nearest (e.g., as determined by cosine similarity) to the feature vector of an expression and/or percepts may be selected. Additionally or alternatively, artificial intelligence agents may be selected based on user-provided preferences, which may indicate a user bias toward or against a particular artificial intelligence agent.

The expression is evaluated using the selected one or more artificial intelligence agents to determine processing modifications at operation 240. An artificial intelligence agent may modify the predefined expression processing of shell 115, which may include a read-evaluate-print loop. In particular, an artificial intelligence agent may introduce a modification to the read function, the evaluation function, and/or the print function.

The processing modifications are applied and the expression is processed at operation 250. The modifications modify the basic, pre-defined expression processing of shell 115 to provide improvements, such as improvements to the user experience (e.g., quality-of-life improvements), error corrections (e.g., correcting a syntactical error), processing improvements (e.g., utilizing other functions or approaches to more efficiently accomplish a processing task), and the like.

Output is provided to a user at operation 260. The output may include any results of shell 115 processing the expression according to the modified expression processing of shell 115. Output may be provided to interface module 120 and presented via display 108 of user device 105.

User feedback is processed to modify the orchestration layer and/or the selected artificial intelligence agents at operation 270. Feedback processing module 140 may analyze user feedback to modify agent selection module 130 and/or agents 135. In some embodiments, feedback processing module 140 prompts a user to provide feedback after one or more agents 135 intervene in the processing of an expression. Additionally or alternatively, feedback processing module 140 may analyze subsequent user activity, including expressions that a user subsequently provides to shell 115 and/or percepts of user device 105 collected by percepts module 125, to determine whether an intervention should be scored as positive or negative. The orchestration layer may be modified based on the feedback such to modify the selection of agents in the future. Additionally or alternatively, feedback can be used to adjust agents 135 themselves; for example, an agent may include a reinforcement learning function that can process user feedback to modify aspects of the agent's provided skills.

Figure 3:
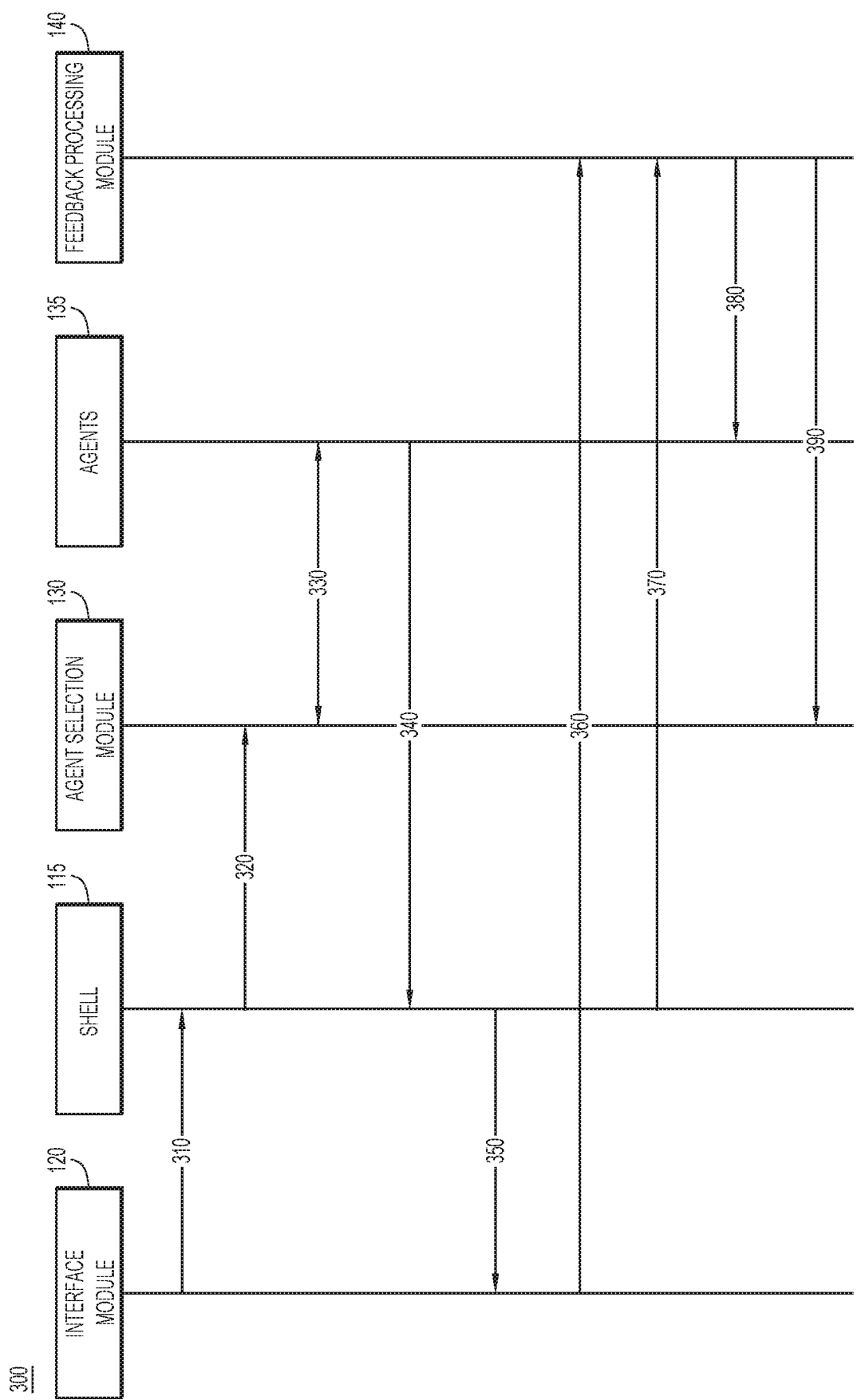
FIG. 3 is a diagram depicting operational flows for adapting processing of a shell in accordance with an embodiment of the present invention.

FIG. 3 is a diagram depicting operational flows 300 for adapting processing of a shell in accordance with an embodiment of the present invention.

Interface module 120 of user device 105 sends user input to shell 115 at operation 310. In response to user input of an expression, interface module 120 may transmit the expression to shell 115 for processing via a read-evaluate-print loop; however, rather than processing the expression using the pre-defined expression processing of shell 115, shell 115 instead shares the user input with agent selection module 130 at operation 320.

Agent selection module 130 sends information to agents 135 at operation 330. The information transmitted at operation 330 may include instructions detailing which agents 135 are selected for evaluating the expression. In some embodiments, operation 330 may include an exchange of information in which the expression and/or percepts are shared with agents 135, which process the information to provide confidence scores back to agent selection module 130.

The selected one or more agents 135 determine modified processing operations and transmit the modified processing operations to shell 115 at operation 340. Shell 115 receives the modifications, and processes the expression according to the modified processing operations. At operation 350, shell 115 shares the results to interface module 120 for presentation to a user.

Feedback processing module 140 obtains user feedback at operations 360 and 370, including any explicit user feedback and implicit feedback obtained from shell 115 (e.g., feedback captured by percepts module 125). Feedback processing module 140 determines adjustments for agents 135 and/or agent selection module 130 and transmits information to enable incorporation of the adjustments by agent selection module 130 and/or agents 135 at operations 380 and 390.

Figure 4:
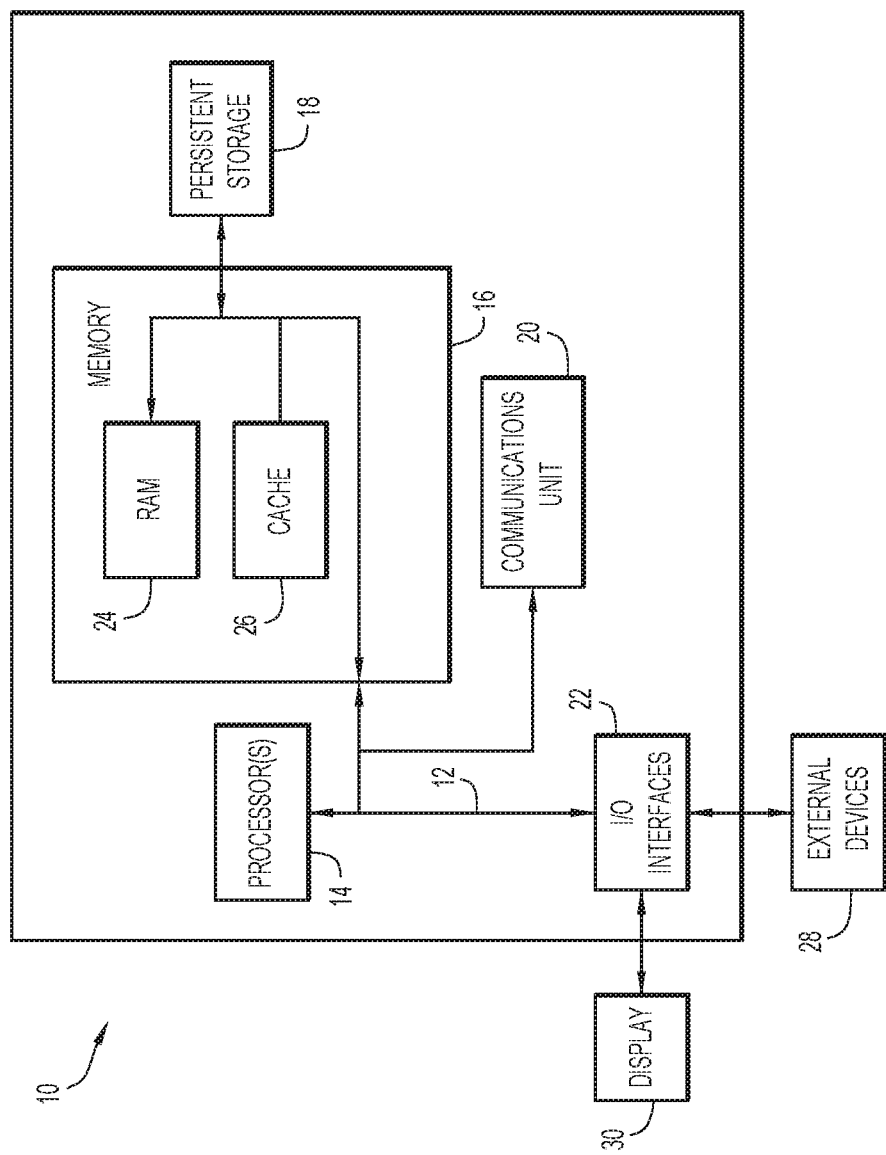
FIG. 4 is a block diagram depicting a computing device in accordance with an embodiment of the present invention.

FIG. 4 is a block diagram depicting components of a computer 10 suitable for executing the methods disclosed herein. Computer 10 may implement user devices 105, data server 150, and/or shell server 175 in accordance with embodiments of the present invention. It should be appreciated that FIG. 4 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data relating to a flexible artificial intelligence agent infrastructure for adapting processing of a shell (e.g., agent selection data, artificial intelligence agent data, percepts data, user preferences, user feedback, shell processing modification data, machine learning model data, etc.) may be stored within any conventional or other data structures (e.g., files, arrays, lists, stacks, queues, records, etc.) and may be stored in any desired storage unit (e.g., database, data or other repositories, queue, etc.). The data transmitted between user device 105, data server 150, and/or shell server 175 may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to a flexible artificial intelligence agent infrastructure for adapting processing of a shell (e.g., agent selection data, artificial intelligence agent data, percepts data, user preferences, user feedback, shell processing modification data, machine learning model data, etc.) may include any information provided to, or generated by, user device 105, data server 150 and/or shell server 175. Data relating to a flexible artificial intelligence agent infrastructure for adapting processing of a shell may include any desired format and arrangement, and may include any quantity of any types of fields of any size to store any desired data. The data relating to a flexible artificial intelligence agent infrastructure for adapting processing of a shell may include any data collected about entities by any collection mechanism, any combination of collected information, and any information derived from analyzing collected information.

The present invention embodiments may employ any number of any type of user interface (e.g., Graphical User Interface (GUI), command-line, prompt, etc.) for obtaining or providing information (e.g., data relating to context-aware conversation thread detection), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of providing a flexible artificial intelligence agent infrastructure for adapting processing of a shell.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, shell 115, interface module 120, percepts modules 125 and 142, agent selection module 130, agents 135, feedback processing module 140, application 160, etc.). These systems may include any types of monitors and input devices (e.g., keyboard, mouse, voice recognition, etc.) to enter and/or view information.

It is to be understood that the software (e.g., browser software, communications software, server software, shell 115, interface module 120, percepts modules 125 and 142, agent selection module 130, agents 135, feedback processing module 140, application 160, etc.) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., browser software, communications software, server software, shell 115, interface module 120, percepts modules 125 and 142, agent selection module 130, agents 135, feedback processing module 140, application 160, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to context-aware conversation thread detection). The database system may be implemented by any number of any conventional or other databases, data stores or storage structures (e.g., files, databases, data structures, data or other repositories, etc.) to store information (e.g., data relating to a flexible artificial intelligence agent infrastructure for adapting processing of a shell). The database system may be included within or coupled to the server and/or client systems. The database systems and/or storage structures may be remote from or local to the computer or other processing systems, and may store any desired data (e.g., data relating to a flexible artificial intelligence agent infrastructure for adapting processing of a shell).

The present invention embodiments may employ any number of any type of user interface (e.g., Graphical User Interface (GUI), command-line, prompt, etc.) for obtaining or providing information (e.g., data relating to context-aware conversation thread detection), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for any number of applications in the relevant fields, including, but not limited to, providing artificially-intelligent agents and corresponding techniques to modify any pre-defined expression processing of a computing device.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for adapting processing of expressions by a command-line interface, the computer-implemented method comprising:
   analyzing an expression provided to the command-line interface by a user, wherein the command-line interface includes pre-defined expression processing;
   selecting one or more artificial intelligence agents of a plurality of artificial intelligence agents based on the analysis of the expression, wherein each artificial intelligence agent comprises a particular machine learning model trained to modify processing of expressions provided to the command-line interface, wherein each of the plurality of artificial intelligence agents are trained to perform a different functionality from a group of: an error-correcting feature, a natural language processing feature, an automated troubleshooting feature, an expression sequence automation feature, and a user feedback feature, and wherein the one or more artificial intelligence agents are selected by:
      processing the expression with the plurality of artificial intelligence agents to indicate a confidence score for a decision of each artificial intelligence agent of the plurality of artificial intelligence agents; and
      selecting the one or more artificial intelligence agents based on the indicated confidence scores;
   evaluating the expression by the selected one or more artificial intelligence agents to determine processing modifications for the pre-defined expression processing; and
   processing the expression in accordance with the determined processing modifications and providing results to the command-line interface.

2. The computer-implemented method of claim 1, wherein an artificial intelligence agent of the plurality of artificial intelligence agents provides the expression to the command-line interface, and further comprising:
   adjusting the artificial intelligence agent based on the processing of the expression in accordance with the determined processing modifications.

3. The computer-implemented method of claim 1, further comprising: analyzing one or more percepts captured from a computing device associated with the command-line interface to select the one or more artificial intelligence agents.

4. The computer-implemented method of claim 3, further comprising: analyzing the one or more percepts with the selected one or more artificial intelligence agents to determine the processing modifications.

5. The computer-implemented method of claim 1, wherein selecting the one or more artificial intelligence agents is further based on an identity of the user.

6. The computer-implemented method of claim 1, wherein the one or more artificial intelligence agents are selected by an orchestration layer, and further comprising:
   in response to processing the expression and providing the results to the command-line interface, obtaining feedback from a computing device associated with the command-line interface; and
   processing the feedback to indicate a modification to one or more of: the orchestration layer, and an artificial intelligence agent of the plurality of artificial intelligence agents.

7. The computer-implemented method of claim 6, wherein the feedback is based on one or more from a group of: user-provided feedback, and feedback based on user actions performed subsequent to providing the results to the command-line interface.

8. A computer system for adapting processing of expressions by a command-line interface, the computer system comprising:
   one or more computer processors;
   one or more computer readable storage media;
   program instructions stored on the one or more computer readable storage media for execution by at least one of the one or more computer processors, the program instructions comprising instructions to:
   analyze an expression provided to the command-line interface by a user, wherein the command-line interface includes pre-defined expression processing;
   select one or more artificial intelligence agents of a plurality of artificial intelligence agents based on the analysis of the expression, wherein each artificial intelligence agent comprises a particular machine learning model trained to modify processing of expressions provided to the command-line interface, wherein each of the plurality of artificial intelligence agents are trained to perform a different functionality from a group of: an error-correcting feature, a natural language processing feature, an automated troubleshooting feature, an expression sequence automation feature, and a user feedback feature, and wherein the one or more artificial intelligence agents are selected by:
   processing the expression with the plurality of artificial intelligence agents to indicate a confidence score for a decision of each artificial intelligence agent of the plurality of artificial intelligence agents; and
   selecting the one or more artificial intelligence agents based on the indicated confidence scores;
   evaluate the expression by the selected one or more artificial intelligence agents to determine processing modifications for the pre-defined expression processing; and
   process the expression in accordance with the determined processing modifications and providing results to the command-line interface.

9. The computer system of claim 8, wherein the program instructions further comprise instructions to: analyze one or more percepts captured from a computing device associated with the command-line interface to select the one or more artificial intelligence agents.

10. The computer system of claim 9, wherein the program instructions further comprise instructions to: analyze the one or more percepts with the selected one or more artificial intelligence agents to determine the processing modifications.

11. The computer system of claim 8, wherein the instructions to select the one or more artificial intelligence agents are further based on an identity of the user.

12. The computer system of claim 8, wherein the one or more artificial intelligence agents are selected by an orchestration layer, and wherein the program instructions further comprise instructions to:
   in response to processing the expression and providing the results to the command-line interface, obtain feedback from a computing device associated with the command-line interface; and
   process the feedback to indicate a modification to one or more of: the orchestration layer, and an artificial intelligence agent of the plurality of artificial intelligence agents.

13. The computer system of claim 12, wherein the feedback is based on one or more from a group of: user-provided feedback, and feedback based on user actions performed subsequent to providing the results to the command-line interface.

14. A computer program product for adapting processing of expressions by a command-line interface, the computer program product comprising one or more computer readable storage media collectively having program instructions embodied therewith, the program instructions executable by a computer to cause the computer to:

analyze an expression provided to the command-line interface by a user, wherein the command-line interface includes pre-defined expression processing;

select one or more artificial intelligence agents of a plurality of artificial intelligence agents based on the analysis of the expression, wherein each artificial intelligence agent comprises a particular machine learning model trained to modify processing of expressions provided to the command-line interface, wherein each of the plurality of artificial intelligence agents are trained to perform a different functionality from a group of: an error-correcting feature, a natural language processing feature, an automated troubleshooting feature, an expression sequence automation feature, and a user feedback feature, and wherein the one or more artificial intelligence agents are selected by:

processing the expression with the plurality of artificial intelligence agents to indicate a confidence score for a decision of each artificial intelligence agent of the plurality of artificial intelligence agents; and selecting the one or more artificial intelligence agents based on the indicated confidence scores;

evaluate the expression by the selected one or more artificial intelligence agents to determine processing modifications for the pre-defined expression processing; and process the expression in accordance with the determined processing modifications and providing results to the command-line interface.

15. The computer program product of claim 14, wherein the program instructions further cause the computer to: analyze one or more percepts captured from a computing device associated with the command-line interface to select the one or more artificial intelligence agents.

16. The computer program product of claim 15, wherein the program instructions further comprise instructions to: analyze the one or more percepts with the selected one or more artificial intelligence agents to determine the processing modifications.

17. The computer program product of claim 14, wherein the instructions to select the one or more artificial intelligence agents are further based on an identity of the user.

* * * * *